(12) United States Patent
Propheter-Hinckley et al.

(10) Patent No.: US 10,301,947 B2
(45) Date of Patent: May 28, 2019

(54) GAS TURBINE ENGINE COMPONENT COOLING CIRCUIT

(71) Applicant: United Technologies Corporation, Farmington, CT (US)

(72) Inventors: Tracy A. Propheter-Hinckley, Rocky Hill, CT (US); Steven Bruce Gautschi, Milton, MA (US); San Quach, Southington, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/997,943

(22) Filed: Jun. 5, 2018

(65) Prior Publication Data

US 2019/0017390 A1     Jan. 17, 2019

Related U.S. Application Data

(62) Division of application No. 13/565,877, filed on Aug. 3, 2012, now Pat. No. 10,100,646.

(51) Int. Cl.
| | |
|---|---|
| *B22C 9/10* | (2006.01) |
| *F01D 5/18* | (2006.01) |
| *B22C 9/04* | (2006.01) |
| *F28F 7/00* | (2006.01) |
| *B23P 15/02* | (2006.01) |

(52) U.S. Cl.
CPC ............... *F01D 5/186* (2013.01); *B22C 9/04* (2013.01); *B22C 9/10* (2013.01); *B23P 15/02* (2013.01); *F05D 2230/14* (2013.01); *F05D 2230/211* (2013.01); *F05D 2260/204* (2013.01); *F28F 7/00* (2013.01); *Y10T 29/49234* (2015.01)

(58) Field of Classification Search
CPC ............ F01D 5/18; F01D 5/182–5/184; F01D 5/186–5/189; B22C 9/04; B22C 9/10
See application file for complete search history.

(56) References Cited

U.S. PATENT DOCUMENTS

| | | | | |
|---|---|---|---|---|
| 7,438,118 | B2 * | 10/2008 | Santeler | B22C 7/02 164/361 |
| 8,414,263 | B1 * | 4/2013 | Liang | F01D 5/186 416/96 R |
| 2004/0151587 | A1 * | 8/2004 | Cunha | F01D 5/18 416/97 R |
| 2008/0138209 | A1 * | 6/2008 | Cunha | B22C 9/04 416/97 R |
| 2010/0008758 | A1 * | 1/2010 | Cunha | F01D 5/186 415/115 |

(Continued)

*Primary Examiner* — Woody A Lee, Jr.
(74) *Attorney, Agent, or Firm* — Carlson, Gaskey & Olds, P.C.

(57) ABSTRACT

A method of manufacturing a component for a gas turbine engine according to an exemplary aspect of the present disclosure includes forming the component with a first manufacturing technique to include a first cavity and a second cavity, and a microcircuit in fluid communication with the first cavity, the component including an outer wall and a ribbed portion or a bulged portion extending from the outer wall. The exemplary method includes forming a plunged hole with a second manufacturing technique different from the first manufacturing technique to intersect at least a portion of the microcircuit and extend into the ribbed portion or the bulged portion.

20 Claims, 4 Drawing Sheets

(56) References Cited

U.S. PATENT DOCUMENTS

2010/0014102 A1* 1/2010 Blair .................... B22C 7/02
356/630
2012/0207953 A1* 8/2012 Bunker ................ F01D 5/147
428/34.1

* cited by examiner

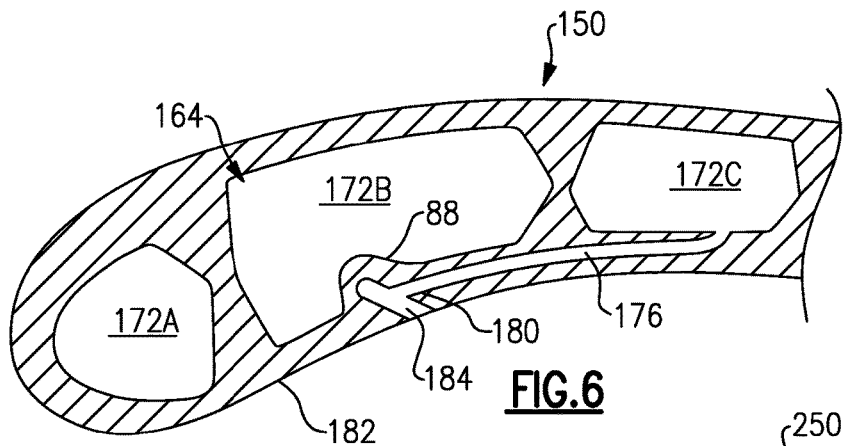
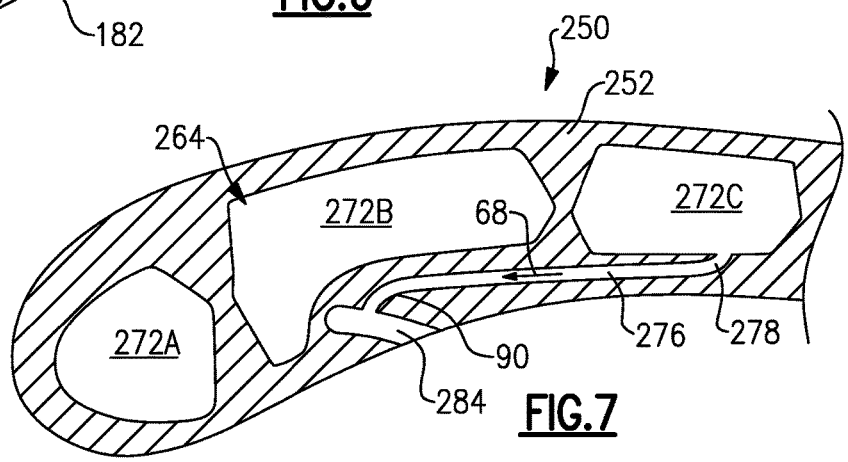
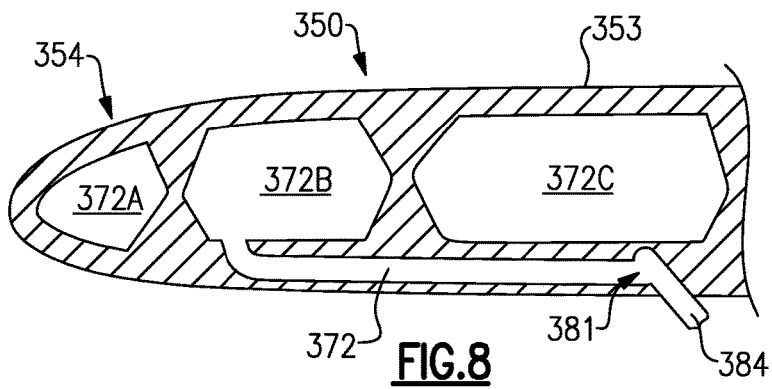
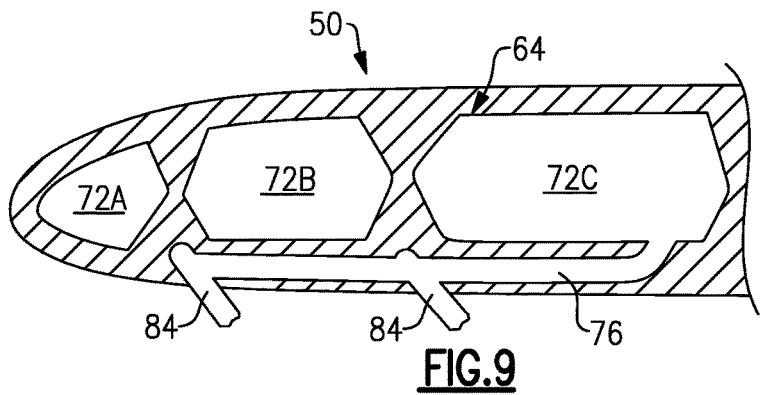

GAS TURBINE ENGINE COMPONENT COOLING CIRCUIT

This application is a divisional of application Ser. No. 13/565,877, which was filed on Aug. 3, 2012.

This invention was made with government support under Contract No. N00019-12-D-0002 awarded by the United States Navy. The government has certain rights in this invention.

BACKGROUND

This disclosure relates to a gas turbine engine, and more particularly to an airfoil component having a cooling circuit that includes a microcircuit and one or more plunged holes that may partially intersect the microcircuit.

Gas turbine engines typically include a compressor section, a combustor section and a turbine section. In general, during operation, air is pressurized in the compressor section and is mixed with fuel and burned in the combustor section to generate hot combustion gases. The hot combustion gases flow through the turbine section which extracts energy from the hot combustion gases to power the compressor section and other gas turbine engine loads.

The compressor and turbine sections of the gas turbine engine typically include alternating rows of rotating blades and stationary vanes. The rotating blades either create or extract energy from the hot combustion gases that are communicated through the gas turbine engine, and the vanes convert the velocity of the airflow into pressure and prepare the airflow for the next set of blades. The hot combustion gases are communicated over airfoils of the blades and vanes. Due to their exposure to hot combustion gases, some airfoils may include cooling circuits that receive cooling airflow for cooling various internal and external surfaces of the airfoils during engine operation.

SUMMARY

A component for a gas turbine engine according to an exemplary aspect of the present disclosure includes, among other things, a body portion, a cooling circuit disposed within the body portion and including at least a first cavity and a microcircuit in fluid communication with the first cavity. A plunged hole intersects at least a portion of the microcircuit.

In a further non-limiting embodiment of the foregoing component for a gas turbine engine, the body portion is an airfoil of one of a blade and a vane.

In a further non-limiting embodiment of either of the foregoing components for a gas turbine engine, the body portion is part of a blade outer air seal (BOAS).

In a further non-limiting embodiment of any of the foregoing components for a gas turbine engine, the microcircuit and the plunged hole are manufactured using different manufacturing methods.

In a further non-limiting embodiment of any of the foregoing components for a gas turbine engine, an outlet of the plunged hole is angled relative to an exterior surface of the body portion.

In a further non-limiting embodiment of any of the foregoing components for a gas turbine engine, the outlet is angled at an angle that is between 10 and 40 degrees relative to the exterior surface.

In a further non-limiting embodiment of any of the foregoing components for a gas turbine engine, the plunged hole intersects one of a forward end portion and a trailing end portion of the microcircuit.

In a further non-limiting embodiment of any of the foregoing components for a gas turbine engine, the microcircuit extends from the first cavity toward the leading edge of the body portion.

In a further non-limiting embodiment of any of the foregoing components for a gas turbine engine, the microcircuit extends from the first cavity to a position adjacent to a rib that is disposed between additional cavities of the cooling circuit.

In a further non-limiting embodiment of any of the foregoing components for a gas turbine engine, a second cavity is adjacent to the first cavity, wherein the second cavity includes a bulged portion and the plunged hole extends into the bulged portion.

In a further non-limiting embodiment of any of the foregoing components for a gas turbine engine, the microcircuit includes a curved portion.

In a further non-limiting embodiment of any of the foregoing components for a gas turbine engine, the plunged hole intersects the curved portion.

A gas turbine engine according to an exemplary aspect of the present disclosure includes, among other things, a compressor section, a combustor section in fluid communication with the compressor section, and a turbine section in fluid communication the combustor section. A component is disposed in at least one of the compressor section and the turbine section. The component includes a body portion, a cooling circuit disposed within the body portion and having a cavity and a microcircuit fluidly connected to the cavity. A plunged hole intersects at least a portion of the microcircuit.

In a further non-limiting embodiment of the foregoing gas turbine engine, the plunged hole intersects with a forward end portion of the microcircuit.

In a further non-limiting embodiment of either of the foregoing gas turbine engines, a second cavity is adjacent to the cavity, and the second cavity includes a bulged portion. The plunged hole extends into the bulged portion.

In a further non-limiting embodiment of any of the foregoing gas turbine engines, the microcircuit includes a curved portion and the plunged hole intersects the curved portion.

In a further non-limiting embodiment of any of the foregoing gas turbine engines, an outlet of the plunged hole is positioned at an angle relative to an exterior surface of the body portion on a pressure side of the body portion.

A method for providing a component of a gas turbine engine with a cooling circuit according to another exemplary aspect of the present disclosure includes, among other things, forming a microcircuit in a body portion of the component using a first manufacturing technique and forming a plunged hole through the body portion such that the plunged hole intersects a portion of the microcircuit using a second manufacturing technique different from the first manufacturing technique.

In a further non-limiting embodiment of the foregoing method for providing a component of a gas turbine engine with a cooling circuit, the first manufacturing technique includes casting and the second manufacturing technique includes machining In a further non-limiting embodiment of either of the foregoing methods for providing a component of a gas turbine engine with a cooling circuit, the step of forming the microcircuit is performed prior to the step of forming the plunged hole.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 6 illustrates a cross-sectional view of a portion of another exemplary airfoil.

FIG. 7 illustrates a cross-sectional view of yet another exemplary airfoil.

FIG. 8 illustrates an exemplary cooling circuit.

FIG. 9 illustrates another exemplary cooling circuit.

DETAILED DESCRIPTION

Figure 1:
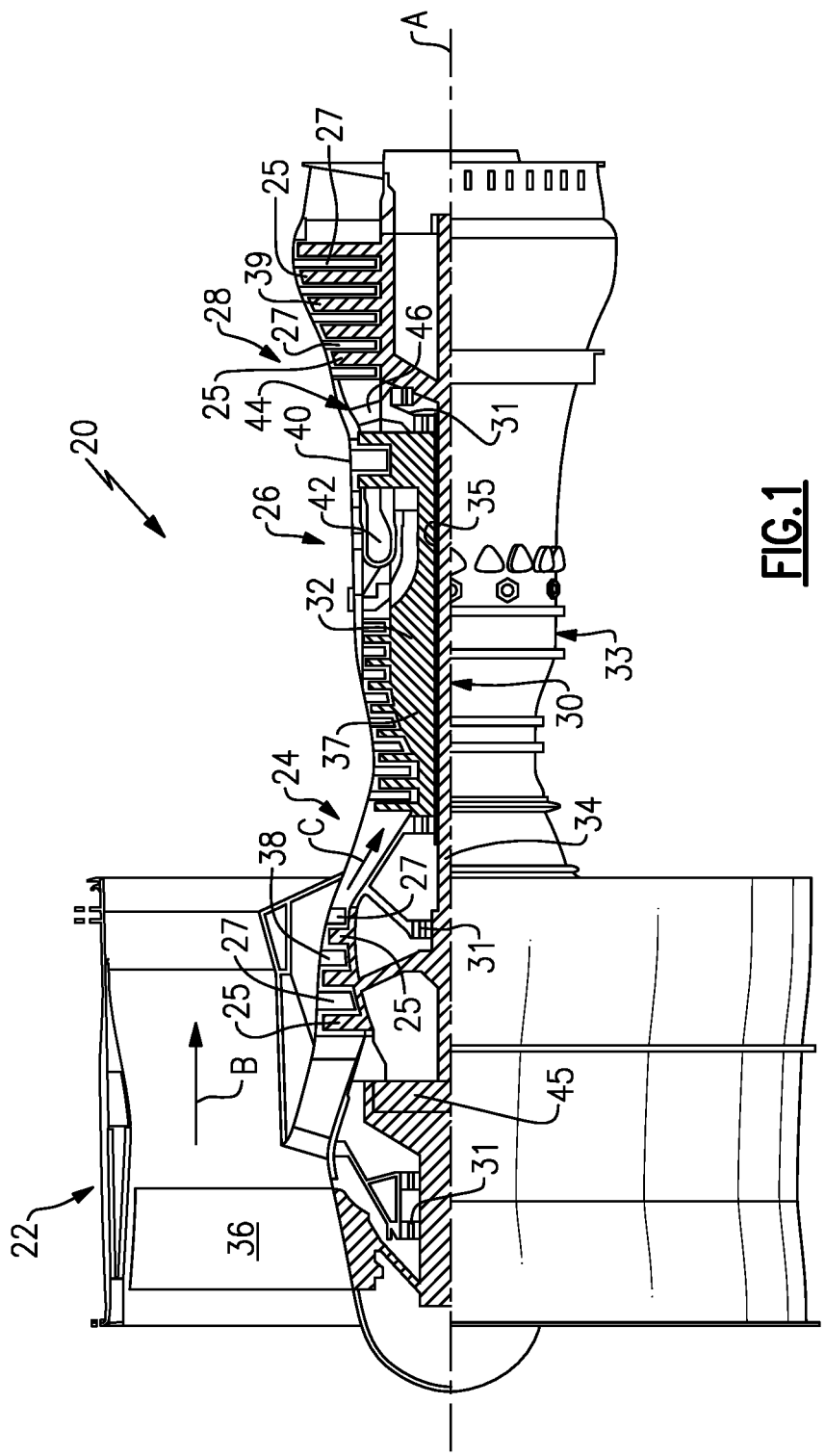
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core air flow to the blades 25 to either add or extract energy.

Various components of a gas turbine engine 20, such as the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as microcircuits and plunged holes that may intersect the microcircuit are discussed below.

Figure 2:
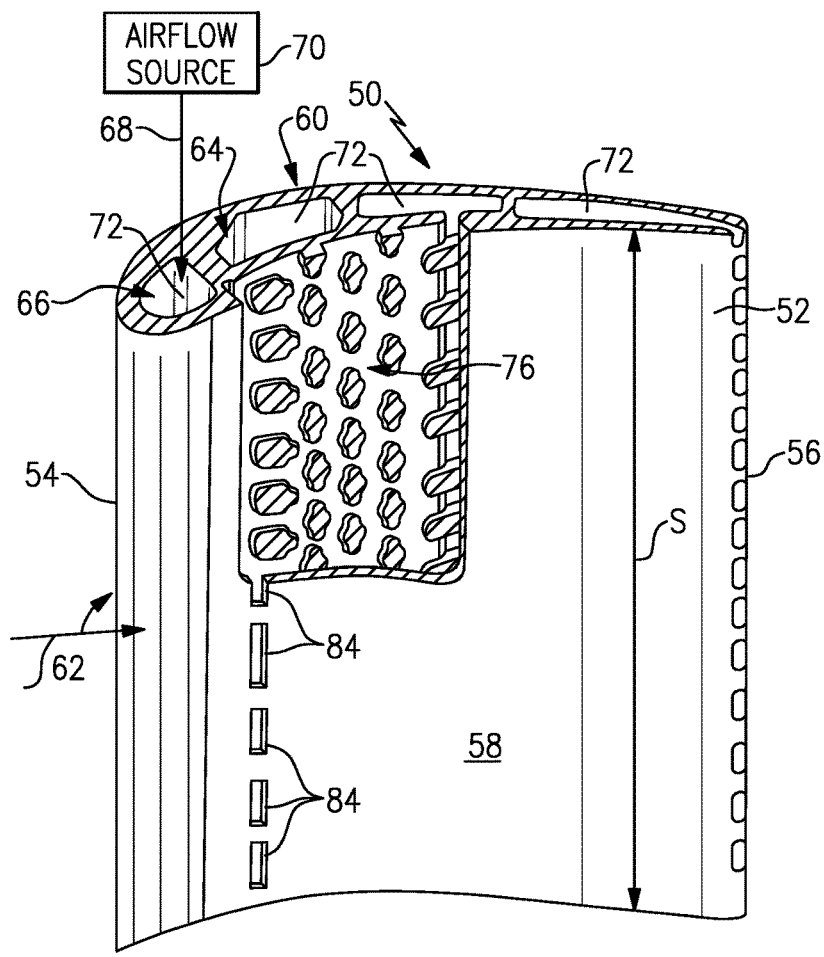
FIG. 2 illustrates an airfoil that can be incorporated into a gas turbine engine.

FIG. 2 illustrates a component 50 that can be incorporated into a gas turbine engine, such as the gas turbine engine 20 of FIG. 1. The component 50 includes a body portion 52 that axially extends between a leading edge 54 and a trailing edge 56 and circumferentially extends between a pressure side 58 and a suction side 60. In this embodiment, the body portion 52 is representative of an airfoil. For example, the body portion 52 could be an airfoil that extends between inner and outer diameter platforms (not shown) where the component 50 is a vane, or could extend from platform and root portions (also not shown) where the component 50 is a blade. Alternatively, the body portion 52 could be a non-airfoil portion of a component.

A gas path 62 is communicated axially downstream through the gas turbine engine 20 along the core flow path C in a direction that extends from the leading edge 54 toward the trailing edge 56 of the body portion 52. The gas path 62 represents communication of core airflow along the core flow path C. The body portion 52 can also extend radially across a span S.

The body portion 52 can also include a cooling circuit 64 for cooling the internal and external surfaces of the component 50. The cooling circuit 64 can include one or more cavities 72 (formed by using ceramic cores) as well as one or more microcircuits 76 (formed by using refractory metal cores) that may be radially, axially and/or circumferentially disposed inside of the body portion 52 to establish cooling passages for receiving a cooling airflow 68 to cool the component 50. For example, the cooling circuit 64 can include an inlet 66 that receives the cooling airflow 68 from an airflow source 70 that is external to the component 50. The cooling airflow 68 is of a lower temperature than the airflow of the gas path 62 that is communicated across the body portion 52. In one example, the cooling airflow 68 is a bleed airflow that can be sourced from the compressor section 24 or any other portion of the gas turbine engine 20 that is upstream from the component 50. The cooling airflow 68 can be circulated through the cooling circuit 64, including through the microcircuit(s) 76, to transfer thermal energy from the component 50 to the cooling airflow 68 thereby cooling the internal and external surfaces of the component 50.

The cooling circuit 64 such as disclosed herein can be disposed in any component that requires dedicated cooling, including but not limited to any component that is positioned within the core flow path C (FIG. 1) of the gas turbine engine 20. In the illustrated embodiments and for the purposes of providing detailed examples herein, the exemplary cooling circuits of this disclosure are illustrated with respect to airfoils, such as those of vanes and/or blades of the compressor section 24 or the turbine section 28. It should be understood; however, that the teachings of this disclosure are not limited to these applications and could extend to other components of the gas turbine engine 20 that may be exposed to relatively extreme environments, including but not limited to blade outer air seals (BOAS), mid-turbine frames, combustor panels, etc.

Figure 3:
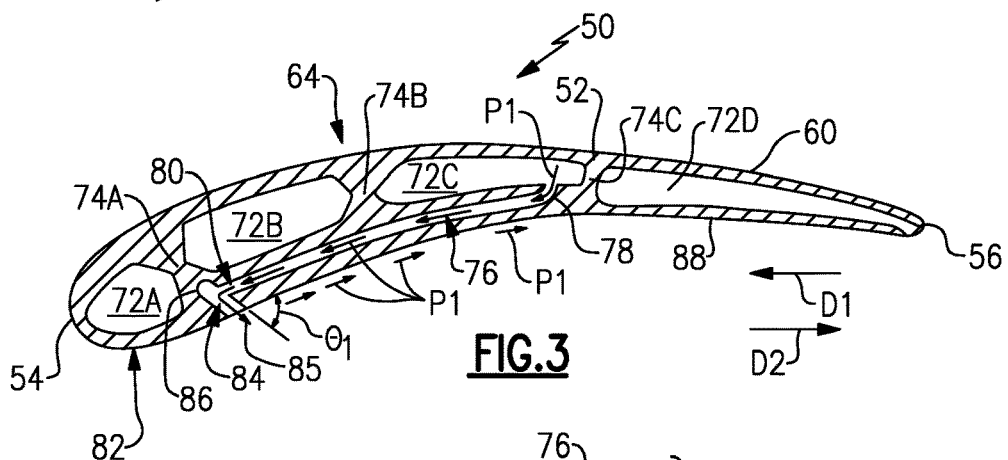
FIG. 3 illustrates a cross-sectional view of an airfoil.

FIG. 3 (with continued reference to FIG. 2) illustrates an exemplary cooling circuit 64 that can be incorporated into the component 50. The cooling circuit 64 is generally defined inside of the body portion 52. In this exemplary embodiment, the cooling circuit 64 establishes a multi-pass cooling passage that includes multiple cavities 72A, 72B, 72C and 72D. Although a four-pass cooling circuit is depicted in this embodiment, it should be understood that the cooling circuit 64 could include any number of passes. For example, a two-pass or a three-pass cooling passage could be incorporated into the component 50.

In this embodiment, the exemplary cooling circuit 64 includes a first cavity 72A (i.e., a leading edge cavity), a second cavity 72B (i.e., a first intermediate cavity), a third cavity 72C (i.e., a second intermediate cavity) and a fourth cavity 72D (i.e., a trailing edge cavity). The cavities 72A, 72B, 72C and 72D can communicate the cooling airflow 68 (See FIG. 2) through the cooling circuit 64 along a serpentine path to cool the internal surfaces of the body portion 52. In other words, the cavities 72A-72D are in fluid communication with one another. A first rib 74A may separate the first cavity 72A from the second cavity 72B, a second rib 74B may be positioned between the second cavity 72B and the third cavity 72C, and a third rib 74C may divide the third cavity 72C from the fourth cavity 72D to define the serpentine path.

The cooling circuit 64 can further include one or more microcircuits 76, although only a single microcircuit 76 is shown. In this exemplary embodiment, the microcircuit 76 is in fluid communication with the third cavity 72C and extends in an upstream direction D1 toward the leading edge 54. Although shown fluidly connected to the third cavity 72C, the microcircuit 76 could be fluidly connected to any cavity 72A, 72B, 72C or 72D of the cooling circuit 64, or to multiple cavities. The microcircuit 76 is fluidly connected to the third cavity 72C via an entrance portion 78 of the microcircuit 76.

A forward end portion 80 of the microcircuit 76 that is positioned opposite from the entrance portion 78 may be positioned adjacent to the second cavity 72B. The microcircuit 76 is but one example of a possible microcircuit, and it should be understood that the microcircuit 76 could include other sizes, shapes and configurations. The microcircuit 76 extends between an external surface 82 of the body portion 52 and one or more of the cavities 72A-72D. The microcircuit 76 may include a radial, axial and circumferential dimension within the body portion 52.

One or more plunged holes 84 can intersect at least a portion of the microcircuit 76 (multiple plunged holes 84 are depicted in FIG. 2) thereby allowing fluid communication between the microcircuit 76 and the plunged hole 84. In the embodiment of FIG. 3, the plunged hole 84 intersects the forward end portion 80 of the microcircuit 76 and extends at least partially into the rib 74A. It should be understood that the plunged holes 84 could intersect the microcircuit at any position along the length thereof, including at a trailing edge portion of the microcircuit 76 (see FIG. 8). In addition, multiple rows of plunged holes 84 can intersect the microcircuit 76 (see FIG. 9).

In this embodiment, the plunged hole 84 is positioned on the pressure side 58 of the component 50 and extends in a direction toward the suction side 60. However, the plunged hole 84 could also be formed through the suction side 60 and extend toward the pressure side 58. Put another way, the microcircuit 76 may be positioned adjacent to either the pressure side 58 or the suction side 60 of the component 50.

Figure 4:
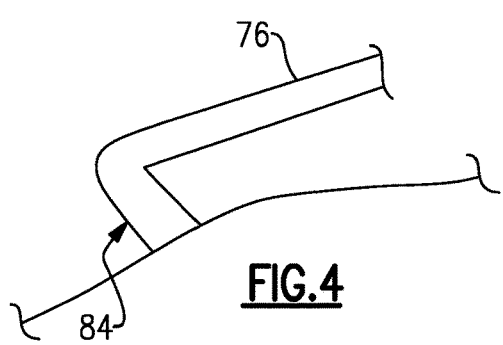
FIG. 4 illustrates a portion of a microcircuit of an airfoil.

A portion 86 of the plunged hole 84 may extend past (i.e., further into the rib 74A) the microcircuit 76. Alternatively, as shown in FIG. 4, the plunged hole 84 could extend directly adjacent to, and not past, the microcircuit 76.

An outlet 85 of the plunged hole 84 extends through the exterior surface 82 of the body portion 52. The outlet 85 can be angled relative to the exterior surface 82. In this exemplary embodiment, the outlet 85 of the plunged hole 84 is positioned at an angle θ1 relative to the exterior surface 82. The angle θ1 is between 0° and 90°, in one embodiment. The angle θ1 could also be between 10° and 40°. In yet another exemplary embodiment, the angle θ1 is between 12° and 30°.

Once the component 50 is mounted for operation within the core flow path C of the gas turbine engine 20, the cooling circuit 64 is operable to cool both the internal and external surfaces of the body portion 52 by using both convective and film cooling techniques. For example, a portion P1 of the cooling airflow 68 can be extracted from the cavity 72C and communicated into the entrance portion 78 of the microcircuit 76. The portion P1 can then be communicated in a forward, upstream direction D1 toward the leading edge 54 of the component 50 to convectively cool the internal surfaces of the body portion 52. The portion P1 of the cooling airflow 68 can next be communicated into the plunged hole 84 prior to exiting the microcircuit 76 through the outlet 85 of the plunged hole(s) 84. The portion P1 of the cooling airflow 68 begins to switch directions once within the plunged hole 84. Once it exits through the outlet 85, the portion P1 of the cooling airflow 68 can travel in an aft, downstream direction D2 that is opposite of the direction D1 within the microcircuit 76. Because the outlet 85 of the plunged hole 84 is angled relative to the exterior surface 82 of the body portion 52, the portion P1 of the cooling airflow 68 that exits the plunged hole 84 can better adhere to the exterior surface 82 to provide improved surface film protection and cooling at the exterior surface 82.

Figure 5A:
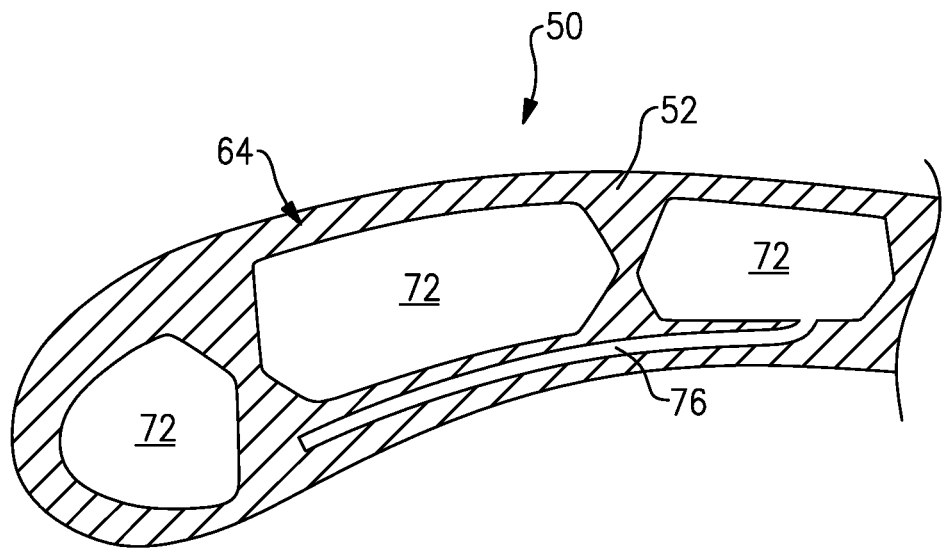
FIGS. 5A and 5B illustrate a method of providing an airfoil with a cooling circuit.
Figure 5B:
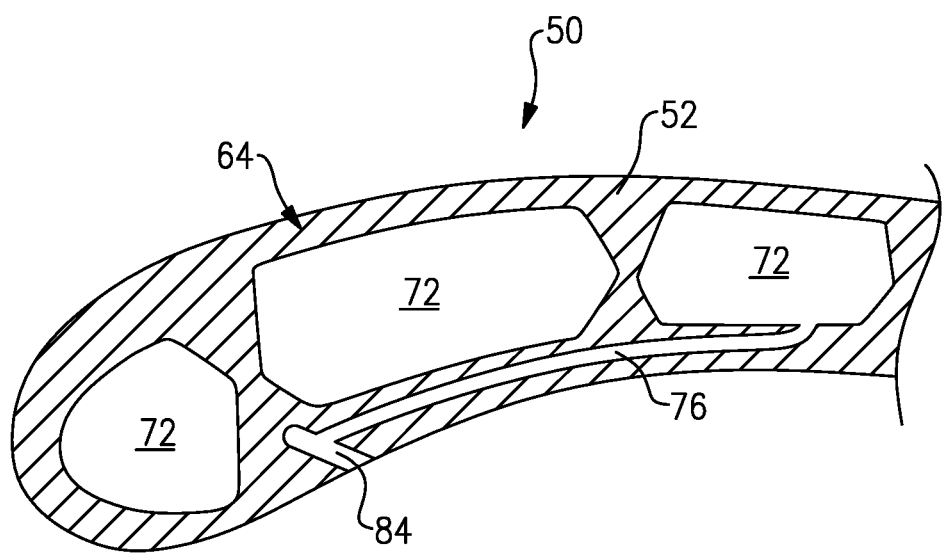

FIGS. 5A and 5B illustrate a method for providing a component 50 of a gas turbine engine 20 with a cooling circuit 64. As shown in FIG. 5A, the component 50 can first be cast, such as in an investment casting process or other suitable casting process, to include a cooling circuit 64 that includes multiple cavities 72 and at least one microcircuit 76 that is in fluid communication with at least one of the cavities 72. In one embodiment, the cavities 72 are formed using a ceramic core and the microcircuit 76 is formed using a refractory metal core (RMC).

Subsequently, in a separate manufacturing step from the casting step described above, one or more plunged holes 84 can be machined into the body portion 52 to intersect a portion of the microcircuit 76 (See FIG. 5B). The plunged hole(s) 84 can be formed using any known machining technique, including but not limited to, electrical discharge machining (EDM). In other words, the microcircuit 76 and the plunged holes 84 can be formed on the component 50 using different manufacturing techniques.

FIG. 6 illustrates another exemplary cooling circuit 164 that can be incorporated into a component 150. In this disclosure, like reference numerals signify like features, whereas reference numerals modified by '100' signify slightly modified features. The exemplary cooling circuit 164 includes a plurality of cavities 172A, 172B and 172C and a microcircuit 176 that is shortened in comparison to the microcircuit 76. The cavity 172B can include a bulged portion 88 that is cast into or cast as part of the cavity 172B. One or more plunged holes 184 can intersect the microcircuit 176. In this exemplary embodiment, the plunged hole 184 intersects a forward end portion 180 of the microcircuit 176 and extends partially into the bulged portion 88 without piercing the second cavity 172B. The bulged portion 88 provides a sufficient wall thickness between an exterior surface 182 of the body portion 152 and the cavity 172B such that the plunged hole 184 does not pierce the cavity 172B during the machining operation used to form the plunged hole 184.

FIG. 7 illustrates yet another exemplary cooling circuit 264 that can be incorporated into a body portion 252 of a component 250. The exemplary cooling circuit 264 includes a plurality of cavities 272A, 272B and 272C and a microcircuit 276. The exemplary microcircuit 276 includes a curled portion 90 opposite from an entrance portion 278 that is in fluid communication with the cavity 272C. One or more plunged holes 284 can intersect the curled portion 90 of the microcircuit 276. The curled portion 90 may improve the airflow transition of the cooling airflow 68 from the microcircuit 276 into the plunged holes 284.

FIG. 8 illustrates yet another exemplary cooling circuit 364 that can be incorporated into a body portion 353 of a component 350. In this embodiment, a microcircuit 376 extends from a second cavity 372B in a direction toward the third cavity 372C. A plunged hole 384 can intersect the microcircuit 376 at a trailing edge portion 381 of the microcircuit 376. The cooling airflow 68 can travel in an aft direction within the microcircuit 376 in this embodiment.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of manufacturing a component for a gas turbine engine, comprising:
    forming the component with a first manufacturing technique to include a first cavity and a second cavity, and a microcircuit in fluid communication with the first cavity, the component including an outer wall and a ribbed portion extending from the outer wall; and
    forming a plunged hole with a second manufacturing technique different from the first manufacturing technique to intersect at least a portion of the microcircuit and extend into the ribbed portion.

2. The method as recited in claim 1, wherein the first manufacturing technique is casting.

3. The method as recited in claim 1, wherein the first manufacturing technique is investment casting.

4. The method as recited in claim 1, wherein the second manufacturing technique is machining.

5. The method as recited in claim 1, wherein the second manufacturing technique is electrical discharge machining.

6. The method as recited in claim 1, comprising:
    forming the first cavity with a ceramic core.

7. The method as recited in claim 1, comprising:
    forming the microcircuit with a refractory metal core.

8. The method as recited in claim 1, wherein the component includes a third cavity, and the second cavity and the third cavity are separated by the ribbed portion.

9. A method of manufacturing a component for a gas turbine engine, comprising:
    forming the component with a first manufacturing technique to include a first cavity and a second cavity, and a microcircuit in fluid communication with the first cavity, the component including an outer wall and a bulged portion extending from the outer wall; and
    forming a plunged hole with a second manufacturing technique different from the first manufacturing technique to intersect at least a portion of the microcircuit and extend into the bulged portion.

10. The method as recited in claim 9, wherein the first manufacturing technique is casting.

11. The method as recited in claim 9, wherein the first manufacturing technique is investment casting.

12. The method as recited in claim 9, wherein the second manufacturing technique is machining.

13. The method as recited in claim 9, wherein the second manufacturing technique is electrical discharge machining.

14. The method as recited in claim 9, comprising:
    forming the first cavity with a ceramic core.

15. The method as recited in claim 9, comprising:
    forming the microcircuit with a refractory metal core.

16. The method as recited in claim 9, wherein the bulged portion extends from the outer wall into the second cavity.

17. A method of manufacturing an airfoil for a gas turbine engine, comprising:
    forming the airfoil with a first manufacturing technique to include a first cavity and a second cavity, and a microcircuit in fluid communication with the first cavity, the airfoil including an outer wall and at least one of a bulged portion extending from the outer wall and a ribbed portion extending from the outer wall; and forming a plunged hole proximate the second cavity with a second manufacturing technique different from the first manufacturing technique to intersect at least a portion of the microcircuit and extend into the at least one of the bulged portion and the ribbed portion.

18. The method as recited in claim 17, wherein the first manufacturing technique is casting, and the second manufacturing technique is machining.

19. The method as recited in claim 17, wherein the first manufacturing technique is performed before the second manufacturing technique.

20. The method as recited in claim 17, comprising:
    forming the first cavity with a ceramic core; and
    forming the microcircuit with a refractory metal core.

* * * * *